(12) United States Patent
Lee et al.

(10) Patent No.: US 8,970,099 B2
(45) Date of Patent: Mar. 3, 2015

(54) IONIZATION CHAMBER WITH BUILT-IN TEMPERATURE SENSOR

(71) Applicant: Institute of Nuclear Energy Research Atomic Energy Council, Executive Yuan, Taoyuan County (TW)

(72) Inventors: Jeng-Hung Lee, Taoyuan County (TW); Shi-Hwa Su, Taoyuan County (TW); Tzeng-Te Huang, Kaohsiung (TW); Bor-Jing Chang, Taipei (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 0 days.

(21) Appl. No.: 14/049,895

(22) Filed: Oct. 9, 2013

(65) Prior Publication Data
US 2014/0117835 A1 May 1, 2014

(30) Foreign Application Priority Data
Oct. 31, 2012 (TW) .............................. 101140305 A

(51) Int. Cl.
*H01J 47/02* (2006.01)
*H01J 49/14* (2006.01)
(52) U.S. Cl.
CPC *H01J 47/02* (2013.01); *H01J 49/14* (2013.01)
USPC .................... 313/231.71; 313/93; 250/423 R; 250/389

(58) Field of Classification Search
USPC ........... 313/231.71, 93; 250/423 R, 361, 336, 250/374
See application file for complete search history.

(56) References Cited

U.S. PATENT DOCUMENTS

| | | | | | |
|---|---|---|---|---|---|
| 4,300,050 | A | * | 11/1981 | Hizo et al. ..................... | 250/374 |
| 5,847,391 | A | * | 12/1998 | Sephton et al. ............ | 250/336.1 |
| 2011/0095199 | A1 * | | 4/2011 | Chu et al. .................. | 250/423 R |
| 2012/0136268 | A1 * | | 5/2012 | Li et al. .......................... | 600/532 |

* cited by examiner

*Primary Examiner* — Tracie Y Green
(74) *Attorney, Agent, or Firm* — WPAT, PC; Justin King

(57) ABSTRACT

The present disclosure relates to an ionization chamber with a built-in temperature sensor, which is especially adapted for devices, such as X-ray units, gamma irradiators and linear accelerators, whichever is used for performing radiation dose output measurement accordingly. In an embodiment, the ionization chamber comprises: a cavity, an inner electrode, a chamber wall, an outer electrode, a guard electrode and a calibrated temperature sensor for detecting real-time temperature inside the cavity of ionization chamber to be used in the correction process of radiation dose measurement signals. With the aforesaid device, not only the accuracy of measurement can be improved effectively, but also the time consumed in a radiation dose measurement period can be reduced greatly since it will no longer bear the disadvantage that the radiation dose measurement has to wait until the temperatures inside and outside the cavity of ionization chamber had reached a thermal equilibrium before the measurement.

16 Claims, 2 Drawing Sheets

IONIZATION CHAMBER WITH BUILT-IN TEMPERATURE SENSOR

FIELD OF THE INVENTION

The present invention relates to an ionization chamber with a built-in temperature sensor, and more particularly, to an ionization chamber capable of detecting real-time temperature inside the cavity of the ionization chamber to be used in the correction process of radiation dose measurement signals, and thereby, effectively improving the accuracy of measurement. The time consumed in a radiation dose measurement can be greatly reduced as it will no longer bear the disadvantage that the radiation dose measurement has to wait until the temperatures inside and outside the cavity of ionization chamber had reached a thermal equilibrium before the measurement.

BACKGROUND OF THE INVENTION

Currently, a conventional ionization chamber is not able to detect real-time temperature inside the cavity of the ionization chamber; as such radiation dose measurement can only be performed after the temperatures inside and outside the cavity of ionization chamber had reached a thermal equilibrium. Thus, not only there will be a great amount of time being wasted for the waiting of thermal equilibrium, but also certain errors in a radiation dose measurement signal correction are inevitable since the signal correction is performed based upon an assumed temperature inside the cavity which is actually the temperature detected outside the cavity Please refer to FIG. 1, which is a cross sectional view of a conventional ionization chamber. As shown in FIG. 1, the cavity 10 is an area producing ionization signals and is formed from the enclosure of the chamber wall 11 and is isolated from external environment, whereas the electrode 12 is provided for collecting ionization signals. It is noted that when the chamber wall 11 is made of a conductive material, the chamber wall 11 itself can be used as an outer electrode 13, but when the chamber wall 11 is made of an insulating material, there will be a conductive material to be coated on the inner surface of the chamber wall 11 so as to form an outer electrode 13. Moreover, the inner electrode 12 is insulated from a guard electrode 14 by an insulating material or air, whereas the chamber stem 15 is provided for fixing the ionization chamber. When in connection, signals detected by the inner electrode 12 are being transmitted via the signal line 121, and the electrical potentials of the guard electrode 14 and the inner electrode 12 are maintained at the same level while applying a high voltage between the inner electrode 12 and the outer electrode 13. Generally, there are small ventilation holes formed on the chamber wall 11 of a conventional ionization chamber for allowing air to flow in and out the ionization chamber. Nevertheless, the conventional ionization chambers still suffer the following shortcomings:

(1) Since there is no way to measure real-time temperature inside the cavity 10 of a conventional ionization chamber, usually a temperature detected by a thermometer 16 that is disposed outside the cavity 10 is used as the real-time temperature inside the cavity 10. Thereby, the actual temperature variation happening inside the cavity 10 may not be reflected in real time on the change of temperature outside the cavity 10 through the air communication via ventilation holes. Consequently, there can be errors being caused in the correction process of radiation dose measurement signals.

(2) The radiation dose measurement of a conventional ionization chamber can only be performed after the temperatures inside and outside the cavity 10 of the ionization chamber had reached a thermal equilibrium, whereas the waiting period can be hours or even longer than a day, depending on the size of the cavity 10.

Therefore, it is in need of an improved ionization chamber capable of effectively improving the accuracy of measurement and greatly reducing the time spent in radiation dose measurement.

SUMMARY OF THE INVENTION

In view of the disadvantages of prior art, the primary object of the present invention is to provide an ionization chamber with a built-in temperature sensor, which is especially adapted for devices, such as X-ray units, gamma irradiators and linear accelerators, whichever is used for performing radiation dose output measurement accordingly. In an embodiment, the ionization chamber comprises: a cavity, an inner electrode, a chamber wall, an outer electrode, a guard electrode and a calibrated temperature sensor for detecting real-time temperature inside the cavity of ionization chamber to be used in the correction process of radiation dose measurement signals. With the aforesaid device, not only the accuracy of measurement can be improved effectively, but also the time consumed in a radiation dose measurement period can be reduced greatly since it will no longer bear the disadvantage of waiting until the temperatures inside and outside the cavity of ionization chamber reach a thermal equilibrium before measurement.

To achieve the above object, the present invention provides an ionization chamber with a built-in temperature sensor, comprising:

a cavity, being a space enclosed inside a chamber wall so as to be separated and insulated from external environment;

a chamber wall, being a material fixed on a chamber stem to insulate a cavity of an ionization chamber and external environment.

an outer electrode, substantially being the chamber wall when the chamber wall is made of a conductive material, or substantially being a conductive material coating on an inner surface of the chamber wall when the chamber wall is made of an insulating material;

an inner electrode, connected to a cavity signal line and disposed inside the cavity while allowing an end of the inner electrode to fix to an electrode fixture;

a guard electrode, disposed on an insulation substrate that is disposed at a position between the outer electrode and the inner electrode while allowing the electrical potentials of the guard electrode and the inner electrode to be maintained at the same level; and a temperature sensor, disposed on an insulation substrate that is disposed at a position between the outer electrode and the guard electrode for detecting temperature inside the cavity in real time while allowing the detected temperature to be outputted via a temperature signal line.

In an embodiment of the invention, the chamber wall is made of a material selected from the group consisting of: graphite materials and plastic materials.

In an embodiment of the invention, the outer electrode is made of a material selected from the group consisting of: graphite materials and plastic materials.

In an embodiment of the invention, the inner electrode is made of a material selected from the group consisting of: graphite materials and metal materials.

In an embodiment of the invention, the inner electrode is formed as a single-rod structure.

In an embodiment of the invention, the guard electrode is formed like a ring.

In an embodiment of the invention, the temperature sensor is made of a thermal resistor.

In an embodiment of the invention, the size of the temperature sensor is smaller than 0.05% of an effective collect volume of the cavity.

In an embodiment of the invention, the inner electrode is fixed to the electrode fixture by the use of a supporting rod.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
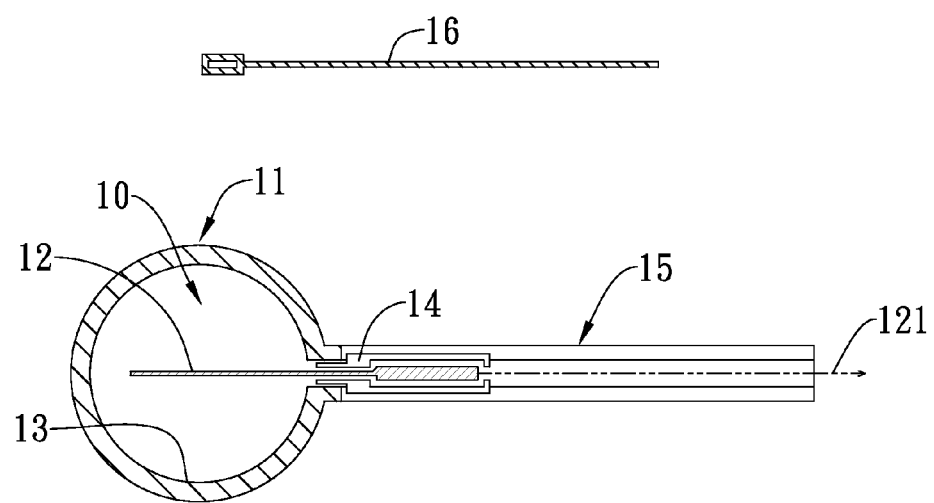
FIG. 1 is a cross sectional view of a conventional ionization chamber.
Figure 2:
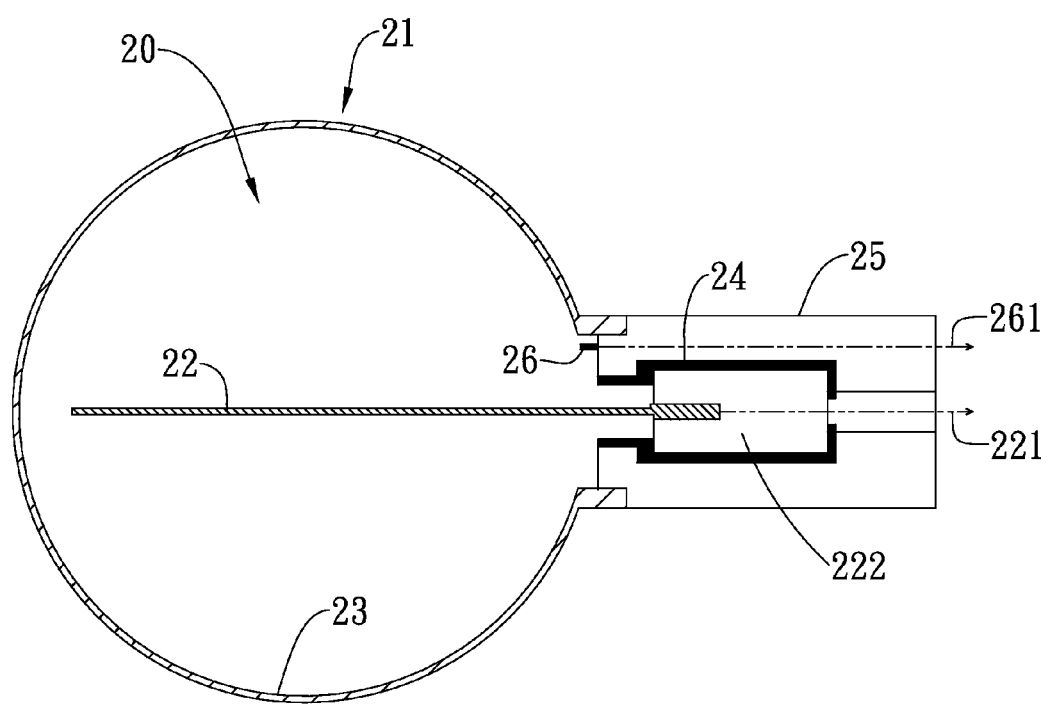
FIG. 2 is a cross sectional view of an ionization chamber with a built-in temperature sensor according to an embodiment of the invention.

Please refer to FIG. 2, which is a cross sectional view of an ionization chamber with built-in temperature sensor according to an embodiment of the invention. For improving the shortcomings of the conventional ionization chambers, the design of disposing a built-in temperature sensor 26 inside the cavity 20 of ionization chamber is adopted in the present invention. As shown in FIG. 2, the inner electrode 22 is formed as a single-rod structure that is fixed to an electrode fixture 222 and is enabled to work cooperatively with a ring-like guard electrode 24, by that operationally signals from the temperature sensor 26 and the inner electrode 22 can be collected respectively and independently without interfering, Thus, the ionization chamber with built-in temperature sensor is composed of: a cavity 20, being a space enclosed inside a chamber wall 21 so as to be separated and insulated from external environment; a chamber wall 21, being a material fixed on a chamber stem 25 to insulate a cavity of a ionization chamber and external environment; an outer electrode 23, substantially being the chamber wall 21 when the chamber wall is made of a conductive material, or substantially being a conductive material coating on an inner surface of the chamber wall 21 when the chamber wall 21 is made of an insulating material; a chamber stem 25, connected to the chamber wall 21 for fixing the ionization chamber; an inner electrode 22, connected to a cavity signal line 221 and disposed inside the cavity 20 while allowing an end of the inner electrode 22 to fix to an electrode fixture 222; a guard electrode 24, disposed on an insulation substrate that is disposed at a position between the outer electrode 23 and the inner electrode 22 while allowing the electrical potentials of the guard electrode 24 and the inner electrode 22 to be maintained at the same level; and a temperature sensor 26, disposed on an insulation substrate that is disposed at a position between the outer electrode 23 and the guard electrode 24 for detecting temperature inside the cavity in real time while allowing the detected temperature to be outputted via a temperature signal line 261. It is noted that the temperature sensor 26 used in the invention can be made of a thermal resistor, but it is not limited thereby and thus can be other electronic temperature sensors or non-electronic temperature sensors which are known to those skilled in the art.

The outer electrode 23 is substantially a conductive shell, and the inner electrode 22 is insulated from the guard electrode 24 by an insulating material or by air while allowing the electrical potentials of the inner electrode 22 and the guard electrode 24 to be maintained at the same level, and signals detected by the inner electrode 22 is being transmitted via the cavity signal line 221, while applying a high voltage between the outer electrode 23 and the inner electrode 22. Moreover, the temperature sensor 26 that had been calibrated is mounted on an insulation substrate disposed at a position between the guard electrode 24 and the outer electrode 23. For preventing the effectiveness of the guard electrode 26 from being interfered by the temperature sensor 26, the size of the temperature sensor 26 must be smaller than 0.05% of an effective collect volume of the cavity 20. Thereby, temperature inside the cavity 20 of the ionization chamber can be detected and obtained in real time, and thus not only the accuracy of measurement can be improved effectively, but also the time consumed in a radiation dose measurement can be reduced greatly.

In the ionization chamber with a built-in temperature sensor of the invention, there is a high voltage being applied between the outer electrode 23 and the inner electrode 22, the inner electrode 22 is connected to an electrometer via the cavity signal line 221 so as to be used for radiation dose measurement, and the temperature sensor 26 is connected to a thermometer via the temperature signal line 261 so as to be used for measuring temperature inside the cavity 20 to be used in a correction process of radiation dose measurement signals so that the accuracy of measurement can be improved effectively. It is noted that the structure of the aforesaid ionization chamber with a built-in temperature sensor can be divided into four parts, as following:

(1) Cavity 20 and chamber wall 21: the chamber wall 21 of the cavity 20 can be made of a material selected from the group consisting of: graphite materials and plastic materials, while the thickness of the chamber wall 21 is determined according to the requirement for achieving electronic equilibrium.

(2) Inner electrode 22: the inner electrode 22 is a device for collecting ionization signals and can be made of a material selected from the group consisting of: graphite materials and metal materials, and moreover, the inner electrode 22 is fixed to the electrode fixture 222 by the use of a supporting bar without interfering the guard electrode 24 for preventing current leakage.

(3) Outer electrode 23: the outer electrode 23 can be made of a material selected from the group consisting of: graphite materials and plastic materials, whereas the outer electrode 23 is substantially the chamber wall 21 when the chamber wall 21 is made of a conductive material, or is substantially being a conductive material coating on an inner surface of the chamber wall 21 when the chamber wall is made of an insulating material, and moreover, the thickness of the outer electrode 23 or the chamber wall 21 is determined according to the radiation dose that is to be measured without causing the incident radiation to be overly attenuated, without causing any spectrum change and without affecting electronic equilibrium.

(4) Guard electrode 24 and temperature sensor 26: the size of the temperature sensor 26 must be smaller than 0.05% of an effective collect volume of the cavity 20, whereas the temperature sensor 26 must be calibrated before being installed on an insulation substrate that is disposed between the guard electrode 24 and the outer electrode 23, by that operationally signals from the temperature sensor 26 and the inner electrode 22 can be collected respectively and independently without interfering.

To sum up, the present invention provides an ionization chamber with a built-in temperature sensor, which is especially adapted for devices, such as X-ray units, gamma irradiators and linear accelerators, whichever is used for performing radiation dose output measurement accordingly. In an embodiment, the ionization chamber comprises: a cavity, an inner electrode, a chamber wall, an outer electrode, a guard electrode and a calibrated temperature sensor for detecting real-time temperature inside the cavity of ionization chamber to be used in the correction process of radiation dose measurement signals. With the aforesaid device, not only the accuracy of measurement can be improved effectively, but also the time consumed in a radiation dose measurement period can be reduced greatly since it will no longer bear the disadvantage of waiting until the temperatures inside and outside the cavity of ionization chamber reach a thermal equilibrium before measurement.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An ionization chamber with a built-in temperature sensor, comprising:
   a cavity;
   a chamber wall, fixed on a chamber stem and enclosing said cavity to separate and insulate said cavity from an external environment;
   an outer electrode, substantially being the chamber wall when the chamber wall is made of a conductive material, or substantially being a conductive material coating on an inner surface of the chamber wall when the chamber wall is made of an insulating material;
   an inner electrode, connected to a cavity signal line and disposed inside the cavity while allowing an end of the inner electrode to fix to an electrode fixture;
   a guard electrode, disposed on an insulation substrate that is disposed at a position between the outer electrode and the inner electrode while allowing the electrical potentials of the guard electrode and the inner electrode to be maintained at the same level; and
   a temperature sensor, disposed on an insulation substrate that is disposed at a position between the outer electrode and the guard electrode for detecting temperature inside the cavity in real time while allowing the detected temperature to be outputted via a temperature signal line, wherein the size of the temperature sensor is smaller than 0.05% of an effective collecting volume of the cavity.

2. The ionization chamber with a built-in temperature sensor of claim 1, wherein the chamber wall is made of a material selected from the group consisting of: graphite materials and plastic materials.

3. The ionization chamber with a built-in temperature sensor of claim 1, wherein the outer electrode is made of a material selected from the group consisting of: graphite materials and plastic materials.

4. The ionization chamber with a built-in temperature sensor of claim 1, wherein the inner electrode is made of a material selected from the group consisting of: graphite materials and metal materials.

5. The ionization chamber with a built-in temperature sensor of claim 1, wherein the inner electrode is formed as a single-bar structure.

6. The ionization chamber with a built-in temperature sensor of claim 1, wherein the guard electrode is formed like a ring.

7. The ionization chamber with a built-in temperature sensor of claim 1, wherein the temperature sensor is made of a thermal resistor.

8. The ionization chamber with a built-in temperature sensor of claim 1, wherein the inner electrode is fixed to an electrode fixture by the use of a supporting bar.

9. An ionization chamber with a built-in temperature sensor, comprising:
   a cavity;
   a chamber wall, made of a conductive material, fixed on a chamber stem and enclosing said cavity to separate and insulate said cavity from an external environment;
   an inner electrode, connected to a cavity signal line and disposed inside the cavity while allowing an end of the inner electrode to fix to an electrode fixture;
   a guard electrode, disposed on an insulation substrate that is disposed at a position between the chamber wall and the inner electrode while allowing the electrical potentials of the guard electrode and the inner electrode to be maintained at the same level; and
   a temperature sensor, disposed on an insulation substrate that is disposed at a position between the chamber wall and the guard electrode for detecting temperature inside the cavity in real time while allowing the detected temperature to be outputted via a temperature signal line.

10. The ionization chamber with a built-in temperature sensor of claim 1, wherein the chamber wall is made of graphite materials.

11. The ionization chamber with a built-in temperature sensor of claim 1, wherein the inner electrode is made of a material selected from a group consisting of: graphite materials and metal materials.

12. The ionization chamber with a built-in temperature sensor of claim 1, wherein the inner electrode is formed as a single-bar structure.

13. The ionization chamber with a built-in temperature sensor of claim 1, wherein the guard electrode is formed like a ring.

14. The ionization chamber with a built-in temperature sensor of claim 1, wherein the temperature sensor is made of a thermal resistor.

15. The ionization chamber with a built-in temperature sensor of claim 1, wherein the size of the temperature sensor is smaller than 0.05% of an effective collecting volume of the cavity.

16. The ionization chamber with a built-in temperature sensor of claim 1, wherein the inner electrode is fixed to an electrode fixture by the use of a supporting bar.

\* \* \* \* \*